Patented Aug. 12, 1952

2,606,871

UNITED STATES PATENT OFFICE 2,606,871

REVERSE WETTING, SUBSURFACE FORMATION

Karl C. Ten Brink, Houston, Tex., assignor to The Texas Company, New York, N. Y., a corporation of Delaware No Drawing. Application April 27, 1951, Serial No. 223,432

6 Claims. (Cl. 252—8.55)

The present invention relates to the production of petroleum hydrocarbons from a producing well extending into a porous subsurface formation which in addition to the non-wetting oil phase, contains connate water. More specifically, it concerns reverse wetting the formation to render the formation surfaces water repellent and wettable by oil.

The invention is particularly applicable to a producing well extending into a typical siliceous or calcareous oil bearing formation located above a water table and containing a substantial amount of capillary formation water. In such a preferentially water wet system, the formation water is caused to rise through the minute pores of the formation by capillary attraction to partially saturate the strata and displace a portion of the oil. The petroleum hydrocarbon phase, which is non-wetting as regards the formation surfaces, therefore occupies the residual, somewhat larger spaces of the formation pores. In any event, water tends to be produced with the oil, and moreover reduces the oil permeability of the formation to the extent that it occupies the internal pores.

Various treatments have been proposed to reverse the wetting characteristics of the formation as regards the hydrocarbon and the water phases so that the capillary rise of water into the formation will be overcome, and the formation caused to desaturate itself substantially with respect to water. As a result of such treatment, the flow of oil through the formation will manifestly be facilitated and the undesired production of water along with the oil tend to be avoided.

It has been proposed, in this connection, to deposit, in the form of a precipitate upon the formation surfaces, a preferential wetting agent which is oil wettable and non-wetting toward water. It has also been proposed to set up on the formation surfaces an adsorption film of certain preferential wetting compounds which have strong oleophilic properties and are water repellent.

In accordance with the present invention, highly effective reverse wetting properties are conferred upon the surfaces of the formation by treatment with a salt of a rosin amine. The lower fatty acid salts of a rosin amine are particularly advantageous for this purpose. By the term "lower fatty acid" is meant the fatty acids containing not more than four carbon atoms as, for example, formic, acetic, propionic, and butyric acids. However, the water soluble mineral acid salts of rosin amine as for example, the salts of hydrochloric and sulfuric acid are also effective.

The mechanism of such reagent from the standpoint of reverse wetting the formation surrounding the well bore is not known, but the effect as regards lowering the amount of water held by the formation is rapid and profound wherever localized physical contact is realized between the rosin amine salt and the porous surfaces. In addition it is possible to realize reverse wetting of the formation surfaces in the presence of only relatively small concentrations of the salt, substantially less than the concentrations required in the case of reverse wetting agents previously proposed.

In practice, the rosin amine salt is simply brought into contact with the oil bearing formation by forcing it downwardly through, and vertically outwardly from, the well bore in the form of a suitable solution. Dissolved in water, for example, it readily penetrates the most minute capillary recesses of the pores into which it is injected, entering the water containing capillaries and coming into contact with the formation surfaces to render them hydrophobic or water repellent. Preferably, treatment is effected for a substantial distance, as for instance 50–100 radial feet outwardly from the well bore. Advantageously, this treatment is followed by injection of a comparable quantity of hydrocarbon oil from the well bore in the same manner, to force the water out of the previously water wet capillaries and wet them to the maximum possible extent with oil.

As previously intimated, a particular feature of the present invention involves realization of substantial increase in oil permeability as well as material suppression of water flow, by a treatment which is particularly economical from the standpoint of the treating agent employed and the relatively small quantity required to realize substantial improvement. For example, reverse wetting of sands is readily effected by a solution of rosin amine acetate in a concentration of only 0.0025 per cent by weight.

In this connection, it is significant to note that while a number of high molecular weight aliphatic amines and substituted ammonium compounds have been hitherto proposed to effect reverse wetting of normally water wet, oil bearing strata, the rosin amine from which the present salts are formed appears, per se, to have no appreciable activity in this regard. Therefore, it is believed particularly surprising that the lower fatty acid salts of the specific rosin amine are outstanding as regards effectiveness as a reverse wetting agent for oil bearing formations.

In carrying out the present process, therefore, production from the well is stopped and a predetermined quantity of the rosin amine salt solution is pumped down the well bore and out into the formation.

As above indicated, sufficient solution is thus injected to reach the formation surfaces for a substantial radial distance from the well bore. The quantity of solution required is readily determinable on the basis of the porosity of the formation and the extent of treatment desired. While as above indicated, treatment of the formation for 50-100 feet from the well bore is preferable, any substantial but lesser extent of treatment is also effective. Actually the magnitude of the improvement is greatest near the well bore. Therefore, treatment for a radial distance of 10-25 feet is advantageous. On the other hand, treatment for a radial distance of substantially greater than 50-100 feet is seldom justified.

After injection of the required quantity of solution the well may be closed in for a period of time to permit the excess water to settle through the capillary passages and thus contact a substantial vertical section of the formation. Injection may be repeated, if desired, a number of times to assure maximum vertical permeation.

Thereafter, production may be recommenced in the usual manner. As above indicated, however, it is preferred to inject into the formation a substantial quantity of liquid oil which thereby is caused to enter the previously water-bearing capillaries and effect wetting of the treated surfaces by oil as extensively as possible. Preferably, the injection is effected under a substantial pressure above that of formation pressure. The amount of injected oil preferably corresponds, in a general way, with the amount of treating solution preferably injected. Following this the well is placed in production with substantially suppressed delivery of formation water.

By way of illustrating the effectiveness of the present reverse wetting agent a small amount of sand was placed in a 100 cc. Erlenmeyer flask and covered with about 50 cc. of water. After a short period of agitation until the sand was thoroughly water wet, about 25 cc. of kerosene was placed in a flask. After repeated agitation, the water and kerosene separates and the sand simply settles to the bottom in the water layer. In making a comparative test, 0.5 cc. of an 0.25 per cent aqueous solution of rosin amine acetate was added and allowed to dissolve in the water and the agitation and observation repeated.

In the presence of the rosin amine acetate, the sand grains contacting the kerosene layer immediately became kerosene wet and water repellent. The smaller sand grains are actually supported in the kerosene at the kerosene water interface, whereas the heavier sand grains settle into the bottom of the flask carrying with them a surrounding globule of kerosene. Manifestly, therefore, the rosin amine acetate by simple contact with the grains, instantly confers strong reverse wetting properties. In a sub-surface formation, this effect necessarily results in profound desaturation as regards connate formation water.

In a test carried out as above but substituting rosin amine, per se, for the rosin amine acetate, repeated agitation and settling of the vessel resulted in no observable change.

Obviously many modifications and variations of the invention, as hereinbefore set forth, may be made without departing from the spirit and scope thereof and, therefore, only such limitations should be imposed as are indicated in the appended claims.

I claim:

1. In the production of petroleum hydrocarbon by means of a producing well extending into a porous, subsurface, oil-bearing formation containing connate formation water, which wets the surfaces of the formation and is held therein by capillary effect, rendering the formation about the well bore preferentially oil wettable and water repellant by contacting the formation about the well bore with a salt of rosin amine, and thereafter producing hydrocarbon from said formation.

2. The method according to claim 1 wherein said salt is a lower fatty acid of salt of rosin amine.

3. The method according to claim 1 wherein said salt is an inorganic acid salt of rosin amine.

4. The method according to claim 2 wherein said lower fatty acid salt comprises rosin amine acetate.

5. The method according to claim 1 wherein the said salt is contacted with the formation about the well bore in the form of an aqueous solution.

6. The method of treating porous oil bearing formations wet with capillary formation water, for increasing permeability to oil which comprises contacting said formation about the well bore with a lower organic acid salt of rosin amine to render said surfaces preferentially oil wettable and water repellant, thereby effecting substantial desaturation of the formation about the well bore with respect to water.

KARL C. TEN BRINK.

REFERENCES CITED

The following references are of record in the file of this patent:

UNITED STATES PATENTS

| Number | Name | Date |
|---|---|---|
| 2,356,161 | Iler | Aug. 22, 1944 |
| 2,356,254 | Lehmann et al. | Aug. 22, 1944 |
| 2,419,755 | Albaugh | Apr. 29, 1947 |

OTHER REFERENCES

Soap and Sanitary Chemicals, December 1947, pp. 147, 149 and 167.